United States Patent
Kwon (10) Patent No.: US 11,229,824 B2
(45) Date of Patent: Jan. 25, 2022

(54) DETERMINING GOLF CLUB HEAD LOCATION IN AN IMAGE USING LINE DETECTION AND CONTOUR SEPARATION

(71) Applicant: GOLFZON CO., LTD., Daejeon (KR)

(72) Inventor: Gee Hwan Kwon, Seoul (KR)

(73) Assignee: GOLFZON CO., LTD., Daejeon (KR)

( * ) Notice: Subject to any disclaimer, the term of this patent is extended or adjusted under 35 U.S.C. 154(b) by 225 days.

(21) Appl. No.: 16/461,791

(22) PCT Filed: Nov. 23, 2017

(86) PCT No.: PCT/KR2017/013402
§ 371 (c)(1),
(2) Date: May 16, 2019

(87) PCT Pub. No.: WO2018/097612
PCT Pub. Date: May 31, 2018

(65) Prior Publication Data
US 2019/0358491 A1  Nov. 28, 2019

(30) Foreign Application Priority Data

Nov. 23, 2016 (KR) .......................... 10-2016-0156308

(51) Int. Cl.
*G06K 9/32* (2006.01)
*A63B 24/00* (2006.01)
(Continued)

(52) U.S. Cl.
CPC ...... *A63B 24/0021* (2013.01); *A63B 24/0006* (2013.01); *A63B 69/3623* (2013.01);
(Continued)

(58) Field of Classification Search
CPC . A63B 24/0021; A63B 24/0003; A63B 69/36; A63B 69/3658; A63B 2024/0031;
(Continued)

(56) References Cited

U.S. PATENT DOCUMENTS

| 2011/0212791 A1* | 9/2011 | Ueda ............... A63B 69/3623 473/221 |
| 2013/0143682 A1* | 6/2013 | Ueda ............... A63B 69/3623 473/219 |

(Continued)

FOREIGN PATENT DOCUMENTS

| JP | 2005-210666 A | 8/2005 |
| JP | 2013-118876 A | 6/2013 |

(Continued)

OTHER PUBLICATIONS

International Search Report for PCT/KR2017/013402 dated Mar. 28, 2018 from Korean Intellectual Property Office.

*Primary Examiner* — Lawrence S Galka
(74) *Attorney, Agent, or Firm* — Revolution IP, PPLC (57) ABSTRACT

Disclosed are a sensing device for calculating information about a golf shot when the user hits a ball using a golf club in order to take a golf practice or play a virtual golf game using a screen golf system and a sensing method thereof, and in particular a sensing device for calculating information about a golf shot taken by a user, wherein, when acquiring and analyzing an image of a user hitting a ball using a golf club, the sensing device is configured to effectively detect the position of a feature point corresponding to the position of the golf club through analysis of the acquired image without attaching a certain characteristic marker to the golf club and to calculate various kinds of physical information about the motion of the golf club according to a golf shot using the feature point, and a sensing method using the same.

8 Claims, 9 Drawing Sheets

(51) Int. Cl.
*G06T 7/00* (2017.01)
*G06T 7/13* (2017.01)
*H04N 13/204* (2018.01)
*A63B 69/36* (2006.01)
*G06K 9/00* (2006.01)
*G06K 9/46* (2006.01)
*A63B 102/32* (2015.01)
*A63B 71/06* (2006.01)

(52) U.S. Cl.
CPC ........... *G06K 9/00335* (2013.01); *G06K 9/46* (2013.01); *G06T 7/13* (2017.01); *G06T 7/97* (2017.01); *H04N 13/204* (2018.05); *A63B 71/0622* (2013.01); *A63B 2024/0031* (2013.01); *A63B 2071/0694* (2013.01); *A63B 2102/32* (2015.10); *A63B 2220/62* (2013.01); *A63B 2220/807* (2013.01)

(58) Field of Classification Search
CPC ........ A63B 2024/0034; A63B 2220/05; A63B 2220/20; A63B 2220/30; A63B 2220/35; A63B 60/46; G06K 9/3241; G06T 2207/30224; G06T 7/246; G06T 7/73
See application file for complete search history.

(56) References Cited

U.S. PATENT DOCUMENTS

| | | | |
|---|---|---|---|
| 2013/0172094 | A1* | 7/2013 | Ueda ...................... A63B 69/36 473/221 |
| 2014/0003666 | A1* | 1/2014 | Park ...................... G06K 9/3241 382/103 |
| 2016/0243423 | A1 | 8/2016 | Tuxen et al. |
| 2017/0333777 | A1* | 11/2017 | Spivak ............... A63B 71/0605 |

FOREIGN PATENT DOCUMENTS

| | | |
|---|---|---|
| KR | 10-1078975 B1 | 11/2011 |
| KR | 10-2013-0047081 A | 5/2013 |
| KR | 20-2015-0001268 U | 4/2015 |
| KR | 10-2015-0116318 A | 10/2015 |

\* cited by examiner

DETERMINING GOLF CLUB HEAD LOCATION IN AN IMAGE USING LINE DETECTION AND CONTOUR SEPARATION

TECHNICAL FIELD

The present invention relates to a sensing device for acquiring and analyzing an image of a golf club and a ball when a user hits the ball through a golf swing using the golf club in order to calculate sensing data on the motion of the ball and the golf club and transmitting the calculated sensing data to an analysis device of a golf practice system or a screen golf system, which analyzes information about the trajectory of the ball and information about the golf shot using the golf club and provides the analyzed information to the user, and a sensing method using the same.

BACKGROUND ART

In recent years, various simulators and devices for the same have been developed which allow users to enjoy popular sports games, such as baseball, soccer, basketball, and golf, in rooms or in specific places through simulation in the form of interactive sports games.

Particularly, in recent years, a so-called screen golf system has been developed in which, when a user swings a golf club to hit a golf ball placed on a hitting mat, a sensing device senses the hit golf ball and extracts physical characteristics of the moving golf ball so that the trajectory of the golf ball can be simulated on a virtual golf course, thereby allowing the user to enjoy golf in virtual reality.

In order to simulate sports using balls, such as golf balls, using such interactive sports simulators, much research has been conducted into various sensing systems for accurately sensing physical information about the motion of a moving ball.

For example, various sensing devices, such as a sensing device using an infrared sensor, a sensing device using a laser sensor, a sensing device using an acoustic sensor, and a sensing device using a camera sensor, have come onto the market. Much research has been conducted into a camera sensor type sensing device for acquiring and analyzing an image of a moving ball to accurately sense the state of the moving ball.

It is necessary to specify the position of the ball and the position of the golf club using the image acquired by the camera. Unlike a method of specifying the position of the ball, however, it is difficult to perfectly extract and recognize the golf club from the image, since golf clubs have different sizes, shapes, colors, and materials.

In order to solve this problem, a method of attaching a specific marker to a head or a shaft of the golf club and finding the specific marker in the image in order to specify the position of the golf club has been proposed. However, this method has a fatal problem in which a user must use a specific golf club having a specific marker attached thereto when the user takes a golf practice or plays a virtual golf game. Even in the case in which the specific marker is attached to the golf club, the marker may not be perfectly apparent or may be hidden in the image depending on the golf swing. As a result, it is difficult to accurately specify the position of the golf club.

Korean Patent Application No. 10-2011-0025149, Korean Patent Application No. 10-2011-0111875, and Japanese Patent Application Publication No. 2005-210666 are disclosed as conventional art documents related to the present invention.

DISCLOSURE

Technical Problem

It is an object of the present invention to provide a sensing device for calculating information about a golf shot taken by a user when the user hits a ball using a golf club in order to take a golf practice or play a virtual golf game using a screen golf system and a sensing method thereof, and in particular to provide a sensing device for calculating information about a golf shot taken by a user, wherein, when acquiring and analyzing an image of a user hitting a ball using a golf club, the sensing device is configured to effectively detect the position of a feature point corresponding to the position of the golf club through analysis of the acquired image without attaching a certain characteristic marker to the golf club and to calculate various kinds of physical information about the motion of the golf club according to a golf shot using the feature point, and a sensing method using the same.

Technical Solution

In accordance with an aspect of the present invention, the above and other objects can be accomplished by the provision of a sensing method of a sensing device for calculating information about a golf shot taken by a user, the sensing method including acquiring an image of the user hitting a ball using a golf club, detecting a portion corresponding to a straight line through predetermined image processing of the acquired image (a line detection step), analyzing a change in the shape of the straight portion detected at the line detection step in order to detect a predetermined feature point, and calculating the position of the detected feature point as the position of the golf club.

The sensing method may further include analyzing a plurality of frame images continuously acquired at the step of acquiring the image in order to specify an impact time at which the golf club hits the ball, wherein images may be extracted during a predetermined period based on the specified impact time, and the line detection step may be performed for each of the extracted images.

The step of calculating the position of the detected feature point as the position of the golf club may include finding a hosel portion of the golf club, at which a shaft and a head are connected to each other, and detecting the hosel portion as the feature point.

The step of calculating the position of the detected feature point as the position of the golf club may include extracting left and right contours based on the straight line detected at the line detection step, analyzing a change in the distance between the extracted left and right contours, and detecting a position at which the change in the distance between the left and right contours reaches a predetermined level or higher as the feature point.

In accordance with another aspect of the present invention, there is provided a sensing method of a sensing device for calculating information about a golf shot taken by a user, the sensing method including acquiring an image of the user hitting a ball using a golf club, specifying contours of a portion of the golf club extending from a shaft to a head through predetermined image processing of the acquired image, and investigating the contours specified at the step of specifying the contours in order to detect the portion of the golf club at which the head begins from the shaft as a feature point and calculating the position of the detected feature point as the position of the golf club.

The step of specifying the contours may include detecting edge intensities of pixels of the portion of the golf club extending from the shaft to the head in the image through the image processing, and specifying the portion of the golf club at which detected values of the edge intensities are changed to a predetermined level or higher as contours of the portion of the golf club extending from the shaft to the head.

The step of calculating the position of the detected feature point as the position of the golf club may include analyzing a change in the distance between the contours of the portion of the golf club extending from the shaft to the head, and specifying the position of the golf club at which the change in the distance between the contours reaches a predetermined level or higher as the feature point.

In accordance with another aspect of the present invention, there is provided a sensing method of a sensing device for calculating information about a golf shot taken by a user, the sensing method including acquiring an image of the user hitting a ball using a golf club, finding a hosel portion of the golf club at which a shaft and a head are connected to each other through predetermined image processing of the acquired image, setting the position of the hosel portion found at the step of finding the hosel portion as a feature point, and calculating the position of the feature point as the position of the golf club.

The step of finding the hosel portion may include detecting a portion corresponding to a straight line through predetermined image processing of the acquired image, extracting left and right contours based on the detected straight line, analyzing a change in the distance between the extracted left and right contours, and specifying the position of the golf club at which the change in the distance between the left and right contours reaches a predetermined level or higher as the position of the hosel portion.

In accordance with another aspect of the present invention, there is provided a sensing device for calculating information about a golf shot taken by a user, the sensing device including a camera device for acquiring an image of the user hitting a ball using a golf club, and a sensing processor for detecting a portion corresponding to a straight line through predetermined image processing of the acquired image, analyzing a change in the shape of the detected straight portion in order to detect a predetermined feature point, and calculating the position of the detected feature point as the position of the golf club.

The sensing processor may be configured to extract left and right contours based on the straight line, to analyze a change in the distance between the extracted left and right contours, and to detect the position at which the change in the distance between the left and right contours reaches a predetermined level or higher as the feature point.

In accordance with another aspect of the present invention, there is provided a sensing device for calculating information about a golf shot taken by a user, the sensing device including a camera device for acquiring an image of the user hitting a ball using a golf club, and a sensing processor for specifying contours of a portion of the golf club extending from a shaft to a head through predetermined image processing of the acquired image, investigating the specified contours in order to detect the portion of the golf club at which the head begins from the shaft as a feature point, and calculating the position of the detected feature point as the position of the golf club.

In accordance with a further aspect of the present invention, there is provided a sensing device for calculating information about a golf shot taken by a user, the sensing device including a camera device for acquiring an image of the user hitting a ball using a golf club, and a sensing processor for finding a hosel portion of the golf club at which a shaft and a head are connected to each other through predetermined image processing of the acquired image, setting the position of the found hosel portion as a feature point, and calculating the position of the feature point as the position of the golf club.

The camera device may include a plurality of cameras for acquiring images of the same object at different viewing angles, the cameras being synchronized with each other in order to constitute a stereo-type camera, and the sensing processor may be configured to analyze an image acquired by one of the cameras in order to specify an impact time at which the golf club hits the ball, to extract images from the respective cameras during a predetermined period based on the specified impact time when the impact time is specified, and to detect the feature point through the image processing of the extracted images.

Advantageous Effects

A sensing device for calculating information about a golf shot taken by a user according to the present invention and a sensing method using the same have effects in that it is possible to effectively detect position information of a feature point corresponding to the position of a golf club, based on which various kinds of physical information about the motion of the golf club according to the golf shot is calculated, through image analysis, whereby it is possible to sense the position information of the golf club through image processing and analysis of an acquired image without attaching a certain characteristic marker to the golf club.

BEST MODE

A sensing device for calculating information about a golf shot taken by a user according to the present invention and a sensing method using the same will be described in detail with reference to the accompanying drawings.

First, the case in which a sensing device according to an embodiment of the present invention is applied to a virtual golf simulation system for screen golf will be described with reference to FIGS. 1 and 2.

Figure 1:
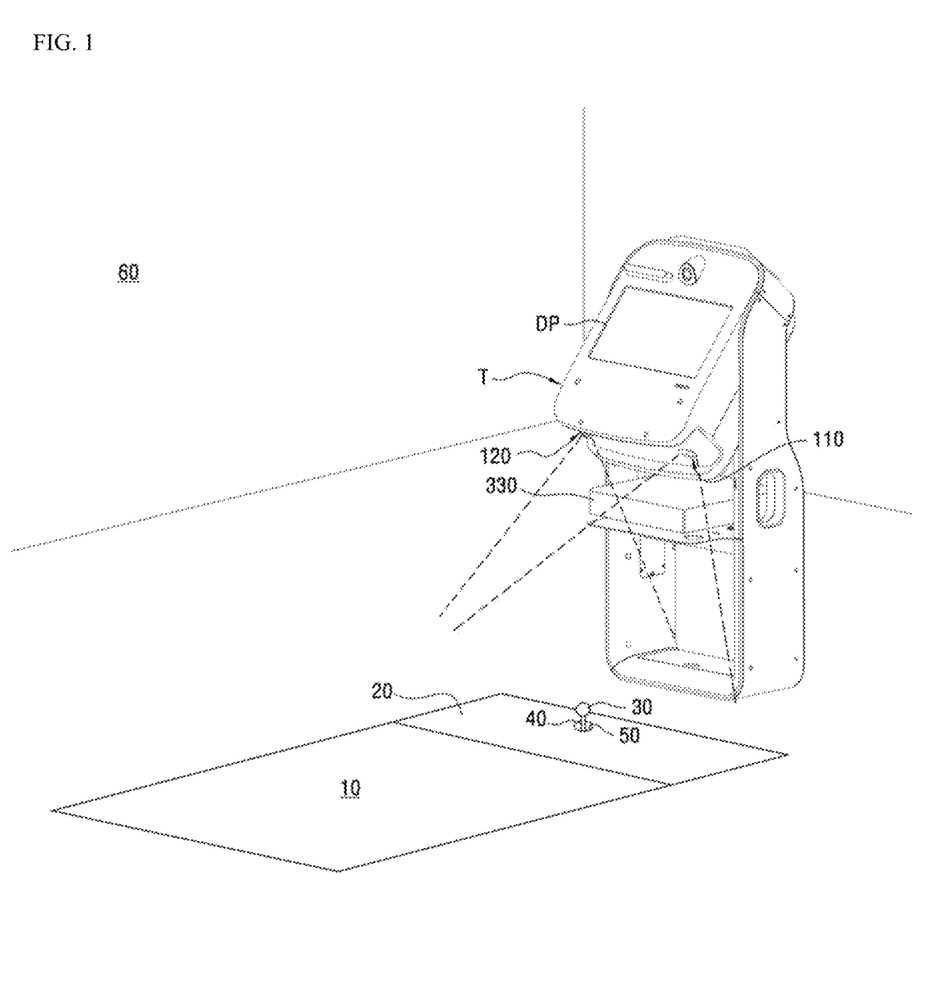
FIG. 1 is a view showing an example of a virtual golf simulation system to which a sensing device according to an embodiment of the present invention is applied.
Figure 2:
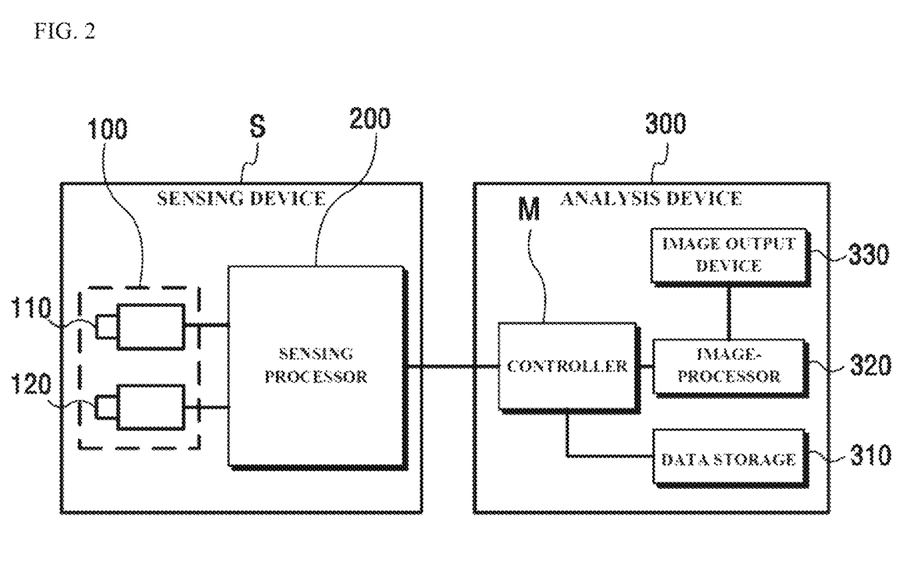
FIG. 2 is a block diagram showing the construction of the virtual golf simulation system shown in FIG. 1.

FIG. 1 is a view showing an example of a virtual golf simulation system to which a sensing device according to an embodiment of the present invention is applied, and FIG. 2 is a block diagram showing the construction of the virtual golf simulation system shown in FIG. 1.

As shown in FIG. 1, the virtual golf simulation system for screen golf may be realized in the form of a terminal apparatus T installed adjacent to a hitting mat 20, on which a ball 30 to be hit by a user in a hitting area 10 using a golf club is placed, and the terminal apparatus T may be configured to include all components shown in the block diagram of FIG. 2.

As shown in FIGS. 1 and 2, the terminal apparatus T includes a sensing device S according to an embodiment of the present invention, which may be configured to capture scenes from before the ball 30 is hit by the golf club until after the ball 30 is hit by the golf club through a camera device 100 including a first camera 110 and a second camera 120 at the side of the hitting mat 20, as shown in FIG. 1.

In addition, the terminal apparatus T includes an analysis device 300 connected to the sensing device S according to the present invention for receiving and analyzing sensing data collected by the sensing device S in order to generate various kinds of analysis information.

Information analyzed and generated by the analysis device 300 is information based on which an image simulating the trajectory of a virtual ball corresponding to the ball hit by the user using the golf club in a virtual space (a virtual golf course) is realized. An image realized using the analysis information generated by the analysis device 300 is output to a screen 60 through an image output device 330. That is, a virtual golf simulation image is output to the screen. A separate display DP included in the terminal apparatus T is also configured to provide the analysis information as a predetermined interface.

In FIG. 1, unexplained reference numeral 40 indicates a tee, on which the ball 30 is placed, and unexplained reference numeral 50 indicates a hole, through which a tee-up device, installed under the hitting mat 20, moves upwards/downwards in the state in which the ball 30 is placed on the tee 40 in order to supply the ball 30 to the hitting mat 20.

The sensing device S is configured to include a camera device 100 and a sensing processor 200. The camera device 100 may include a plurality of cameras for acquiring images of the same object at different viewing angles, for example, a first camera 110 and a second camera 120, as shown in FIGS. 1 and 2. The first camera and the second camera may be synchronized with each other in order to constitute a stereo-type camera. Consequently, two-dimensional information extracted from each of the images of the same object acquired by the first camera 110 and the second camera 120 may be converted into three-dimensional information.

The sensing processor 200 may be configured to perform predetermined processing on the images collected from the respective cameras 110 and 120 of the camera device 100, and may also be configured to extract the object from the images collected from the respective cameras and to calculate three-dimensional position information from two-dimensional position information of the extracted object.

The sensing processor 200 extracts an object corresponding to the ball and an object corresponding to the golf club from each of the images collected from the respective cameras 110 and 120 of the camera device 100, calculates information about the position of the golf club and the position of the ball during the golf swing and during the golf shot, and transmits the calculated position information to the analysis device 300.

The analysis device 300 includes a controller M, a data storage 310, and an image-processor 320. The controller M calculates information, such as a ball speed, an azimuth, an elevation, and a spin, using the information about the position of the ball received from the sensing processor 200, and calculates information, such as a club speed, a club path, and an angle of attack, using the information about the position of the golf club received from the sensing processor. That is, the controller performs a function of calculating various kinds of analysis information about the user's golf shot.

The image-processor 320 realizes an image simulating the trajectory of the ball in the virtual space using various kinds of information calculated by the controller M, or generates analysis information about the user's golf swing or information for golf lessons and provides the generated information to the user. At this time, the image-processor realizes an image using image data for image processing stored in the data storage 310.

The realized image may be transmitted to the image output device 330, through which the image is projected on the screen 60, or may be output through the display DP of the terminal apparatus T.

As described above, not only the image processing of the ball and the generation of sensing data based thereon but also the image processing of the golf club and the generation of sensing data based thereon may be performed by the sensing processor 200. In the present invention, attention is paid to the image processing of the golf club and the generation of sensing data based thereon.

Hereinafter, a sensing method using the sensing device according to the embodiment of the present invention will be described with reference to the flowchart shown in FIG. 3.

First, the camera device captures a user hitting a ball using a golf club in order to acquire an image (S10).

The sensing processor extracts a hitting area having a predetermined position and size from the acquired image and binarizes the extracted hitting area (S11).

One or more objects, each of which is constituted by a group of bright pixels, are searched for in the binarized image in order to detect a ball (S12). For example, in the case in which a plurality of objects, each of which is constituted by a group of bright pixels, is detected, a ball may be detected from the detected objects based on the size, the aspect ratio, and the roundness set for the ball.

The sensing processor may analyze continuously collected images and may detect the ball in order to determine whether the detected ball is stationary for a predetermined amount of time. Here, the case in which the ball is stationary means the case in which the ball does not move out of a predetermined range, for example, the case in which the ball is stationary on the hitting mat for a predetermined amount of time.

In the case in which the ball is stationary for a predetermined amount of time, as described above, a ball-ready state, which indicates that the sensing processor is ready to analyze the image in order to calculate position information of the ball and the golf club, is realized (S13).

In the case in which the ball-ready state is realized, the sensing processor stores the position information of the ball that is ready (S14), extracts an area of interest having a predetermined position and size including the ball that is ready from each of the continuously collected images, and sets a check window having a predetermined size based on the center point of the ball in the extracted area of interest (S15).

Subsequently, the sensing processor senses a change in the value of each pixel in the set check window (S16).

Upon determining that the value of each pixel in the check window exceeds a predetermined value (S17), the sensing processor sets the point of time as an impact time (the time at which the ball is hit by the head of the golf club) and sets the frame as the frame at the impact time (S18).

Hereinafter, a series of processes from step S10 to step S18 will be described in more detail with reference to FIGS. 4 and 5.

Figure 4:
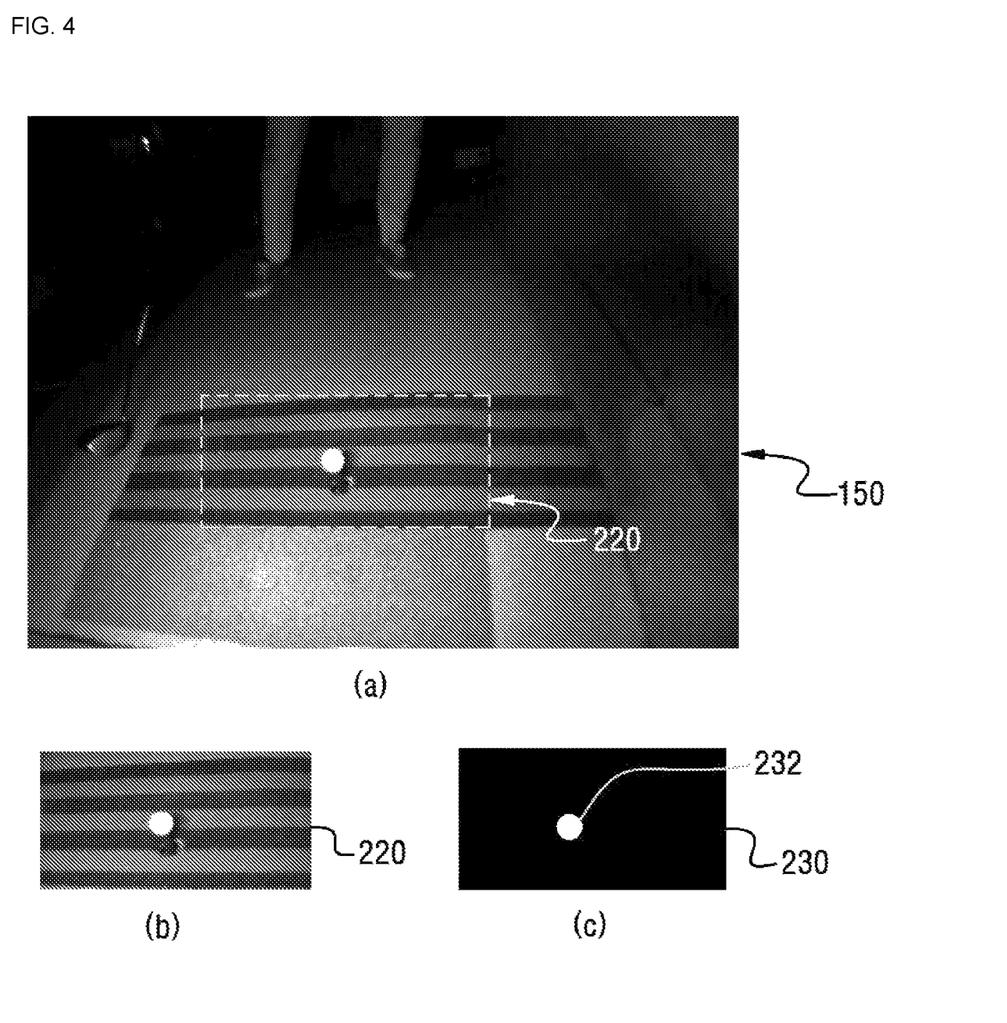
FIGS. 4 and 5 are views illustrating a series of processes in which a sensing processor of the sensing device according to the embodiment of the present invention extracts a ball from an acquired image in order to determine whether a ball is ready and to specify an impact time.

FIG. 4(a) shows an example of an image that is acquired by one of the cameras constituting the camera device and is collected by the sensing processor, FIG. 4(b) shows that a predetermined hitting area 220 is extracted from the image shown in FIG. 4(a), and FIG. 4(c) shows an image obtained by binarizing the hitting area image shown in FIG. 4(b).

The hitting area 220 has a predetermined position in the entire image 150 shown in FIG. 4(a). That is, since the ball is hit by the golf club only on the hitting mat 20 and the position of the hitting mat 20 is not changed, the position and size of the hitting area 220 may be preset such that the entirety or the principal portion of the hitting mat 20 is included in the image acquired by the camera device. The sensing processor may separate the predetermined hitting area 220 from the entire image 150 for each frame image and may intensively observe the separated hitting area 220 in order to rapidly and accurately determine the ball-ready state and the impact time described above.

The image 220 of the hitting area shown in FIG. 4(b) may be binarized in order to obtain the binarized image 230 shown in FIG. 4(c). Since the ball is generally a white color or a bright color, a ball portion 232 appears as a white color on the binarized image 230, and most of the remaining portion appears as a black color on the binarized image.

Consequently, the sensing processor may easily find the ball portion 232 in the binarized image 230.

Figure 5:
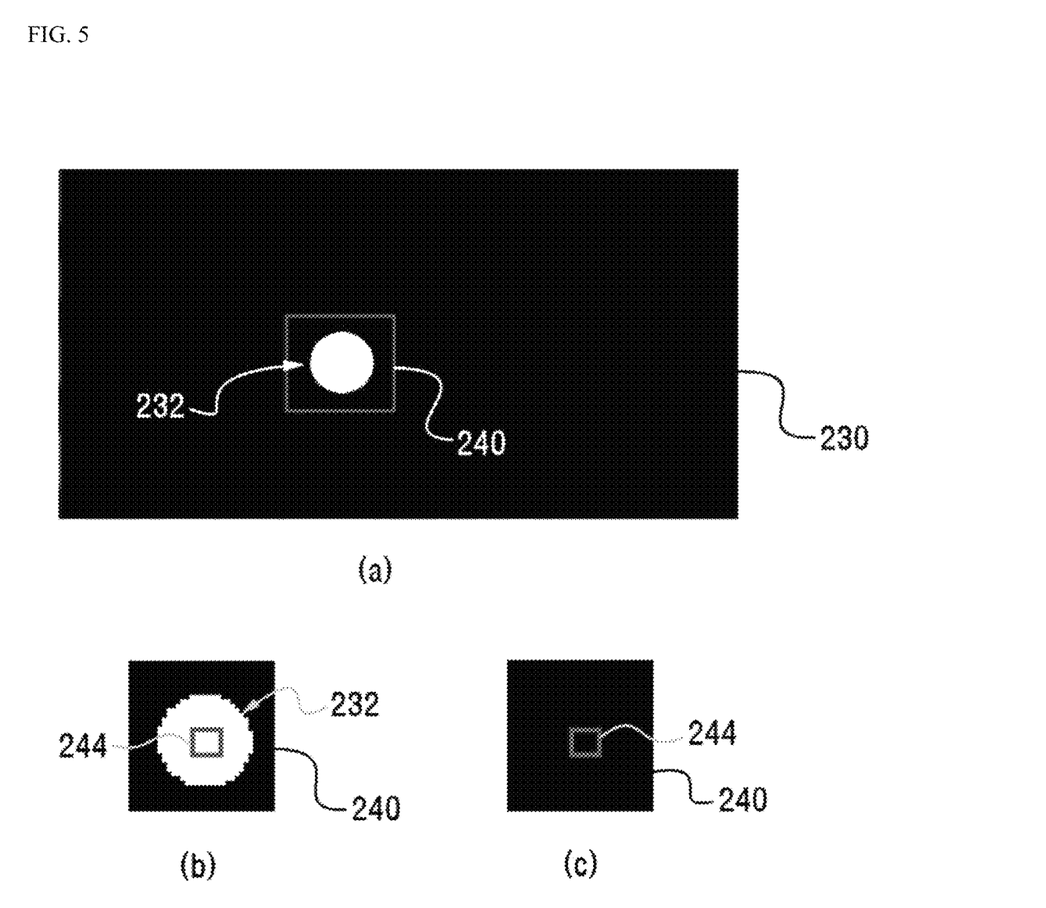

Meanwhile, in FIG. 5(a), an area of interest 240 including the ball may be separated from the binarized image 230 shown in FIG. 4(c), and a small-sized check window 244 including the ball 232 may be set in the separated area of interest 240, as shown in FIGS. 4(b) and 4(c), in order to determine whether an impact has occurred.

As shown in FIG. 5(a), a predetermined sized area of interest 240 including the ball portion 232 may be set in the binarized image 230, and the set area of interest 240 may be separated and processed.

As shown in FIG. 5(b), since the area of interest 240 is an image smaller than the hitting area 230, the impact time may be determined using only the area of interest 240, whereby it is possible to very rapidly and accurately specify the impact time.

The sensing processor may extract the area of interest 240, as described above, may extract the coordinates of the center point of the ball 232 therein, and may set a check window 244 having a predetermined size based on the extracted coordinates of the center point of the ball, as shown in FIG. 5(b).

Preferably, the check window 244 is set so as to have a size smaller than the size of the ball 232.

Subsequently, whether the impact has occurred is determined. Since it is sufficient to check only the check window 244, it is possible to very rapidly determine the impact time.

That is, when the ball is hit, the value of each pixel in the check window 244 is decreased, as shown in FIG. 5(c). In the case in which the value of each pixel in the check window 244 becomes lower than a predetermined level (in the case in which the interior of the check window becomes black or a portion of the check window becomes black), the sensing processor may set the point of time as an impact time and may set the image frame as the frame at the impact time.

As previously described, a plurality of cameras of the camera device of the sensing device may be synchronized with each other in order to constitute a stereo-type camera. In the processes from step S10 to step S18, described with reference to FIGS. 4 and 5, only the image captured using one of the cameras of the camera device may be processed.

Figure 3:
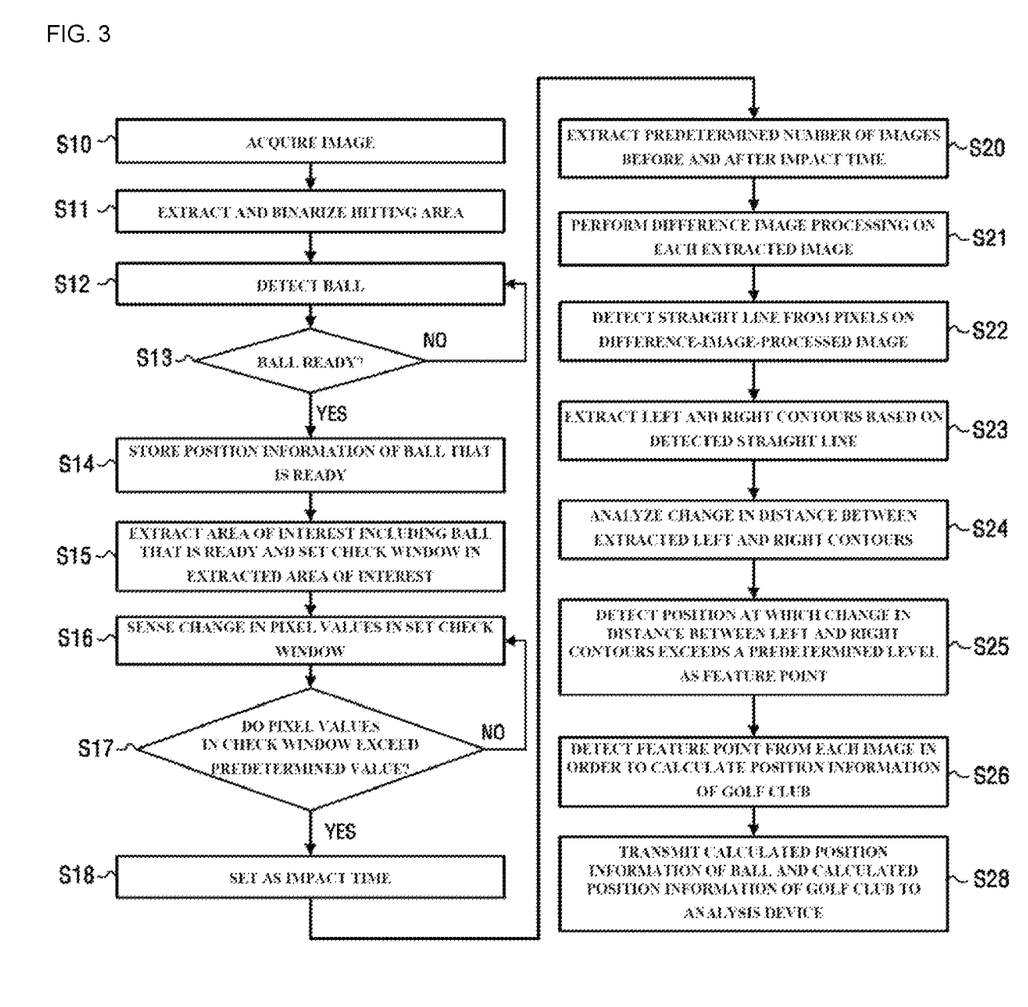
FIG. 3 is a flowchart illustrating a sensing method using the sensing device according to the embodiment of the present invention.

Referring back to the flowchart of FIG. 3, when the impact time is set, the sensing processor extracts a predetermined number of images before and after the impact time (S20).

Here, "impact time" may mean the time at which the impact occurs, or may mean that the frame in which it is determined that the impact occurs is set to be the frame at the impact time. That is, setting the impact time may include the meaning of setting the image frame when the pixel value of each pixel in the check window becomes lower than a predetermined level as the frame at the impact time.

For example, when it is determined that an impact has occurred, the frame at the impact time, 20 frames before the impact time, and 20 frames after the impact time may be extracted.

In the case in which a predetermined number of images is extracted, as described above, the sensing processor performs difference image processing on each of the extracted images (S21).

That is, a difference operation is performed on each of several frame images based on a specific image in order to remove a stationary portion, which does not move, (a background portion (a ball portion is also removed, since the ball portion is a stationary portion before the impact occurs) from each of the images, excluding moving portions (a portion of the golf club, a portion of the body of the user, and the ball portion after the impact).

For example, in the case in which the position of the golf club is calculated using 10 images from the first frame to the tenth frame, each of the second to tenth frame images is difference-image-processed based on the first frame image, which is used as a reference frame.

The sensing device according to the embodiment of the present invention is configured to specify the position of the golf club from the above difference-image-processed images.

Since all golf balls have the same size, shape, and light reflectivity, it is very easy to find a ball in an image. However, since golf clubs have different sizes, shapes, colors, materials, and light reflectivities for respective kinds of golf clubs, respective manufacturers of golf clubs, or respective brands of golf club, it is difficult to find a golf club in an image in a manner similar to the manner in which the ball is found in the image. Furthermore, the pixel value in the image may be similar to the background depending on the light reflectivity of the golf club due to the color or the material of the golf club. In many cases, therefore, it is difficult to distinguish between the golf club and the background, whereby it is very difficult to specify the position of the golf club.

Conventionally, a method of attaching a specific marker to a head or a shaft of the golf club and finding the specific marker in the image in order to specify the position of the golf club has been used in order to overcome this difficulty.

However, the present invention provides a method of effectively specifying the position of the golf club only through image processing in the state in which no specific marker is attached to the golf club, i.e. a markerless-type method of specifying the position of the golf club. In the flowchart of FIG. 3, steps S20 to S26 show this method.

The sensing device according to the present invention sets a specific point of the portion corresponding to the golf club in the image as a feature point, finds the position of the feature point, and uses the found position of the feature point as the position of the golf club.

This feature point may be defined, for example, as the position of the portion of the golf club at which the shaft and the head are connected to each other, i.e. the position of a hosel portion of the golf club. In the case in which the hosel portion of the golf club or the portion of the golf club at which the shaft and the head are connected to each other is hidden by the head within the viewing angle of the camera, the feature point may be defined as a specific position on the head portion.

That is, the portion of the golf club at which the shaft and the head are connected to each other may be found in the image, the found portion of the golf club may be set as the position of the feature point, the feature point may be defined as the position of the golf club, and data processing may be performed. Alternatively, the lowermost point of the head of the golf club may be set as the position of the feature point, the feature point may be defined as the position of the golf club, and data processing may be performed.

The sensing processor detects a straight line from the pixels in the above difference-image-processed image (S22). That is, an equation describing a straight line may be based on a straight-line portion in the image using a Hough transform. In the case in which a straight line is detected in the difference-image-processed image using a Hough transform, as described above, the detected straight line includes the portion corresponding to the shaft of the golf club.

As described above, the straight line is detected in the image, and the sensing processor extracts left and right contours of the object based on the detected straight line (S23). That is, the straight line detected at step S22 may be detected in the state in which the portion of the golf club extending from the shaft to the head is set as the object, the edge intensity of the pixels of the portion of the golf club extending from the shaft to the head may be detected, and the portion of the golf club at which the detected value of the edge intensity is changed to a predetermined level or higher may be extracted as the contours.

The sensing processor calculates the distance between the extracted left and right contours in order to analyze a change in the distance (S24).

The sensing processor detects the position at which a change in the distance between the extracted left and right contours exceeds a predetermined level as the feature point (S25).

The distance between the left and right contours is almost uniform for the shaft of the golf club, but the distance between the contours abruptly and greatly increases for the head of the golf club. Consequently, the portion of the golf club at which the distance between the contours starts to abruptly and greatly increase is set as the hosel portion of the golf club or the portion of the golf club at which the shaft and the head are connected to each other, and the position of the feature point is calculated.

The sensing processor detects the feature point from each of the frame images extracted at step S20, as described above, and calculates the position information of the golf club that is moved according to a golf swing (S26).

The sensing processor extracts the ball through image processing, before the position of the golf club is calculated, as described above, or at same time at which the position of the golf club is calculated, in order to calculate the position information of the ball. In the case in which the position information of the golf club is calculated through steps S20 to S26, the sensing processor transmits the calculated position information of the golf club together with the position information of the ball to the analysis device, which analyzes information about kinematic features of the ball and the golf club using the same (S28).

Hereinafter, a series of processes from step S20 to step S28 will be described in more detail with reference to FIGS. 6 to 8.

Figure 6:
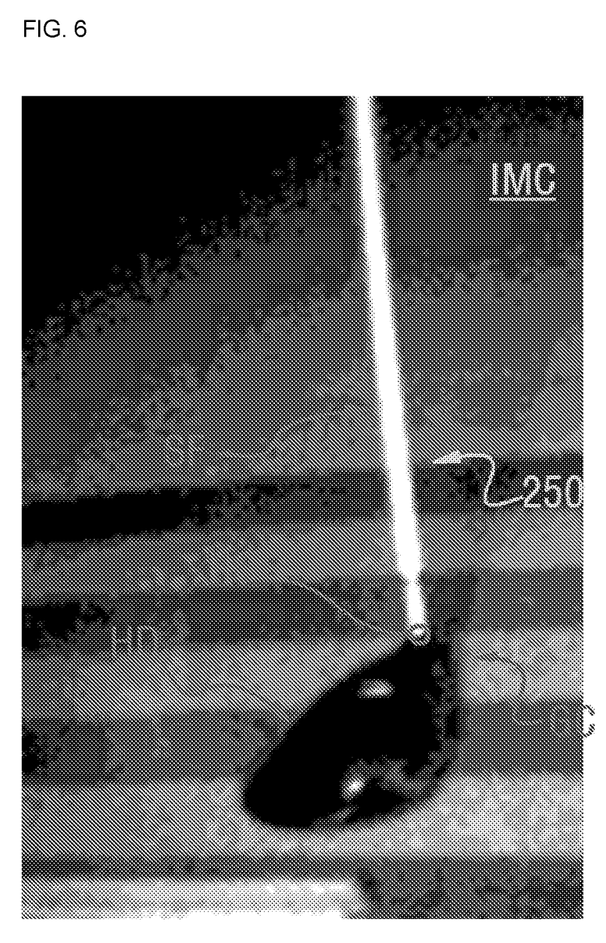
FIGS. 6 to 8 are views illustrating a method by which the sensing processor of the sensing device according to the embodiment of the present invention finds a predetermined feature point in an image and calculates the found feature point as position information of a golf club.

FIG. 6 shows the portion corresponding to the golf club in the image acquired by the camera device of the sensing device according to the embodiment of the present invention. In actuality, the image processed to calculate the position information of the golf club may be extracted from the entire image, as shown in FIG. 6. Alternatively, the entire image may be image-processed in order to calculate the position information of the golf club.

Figure 7:
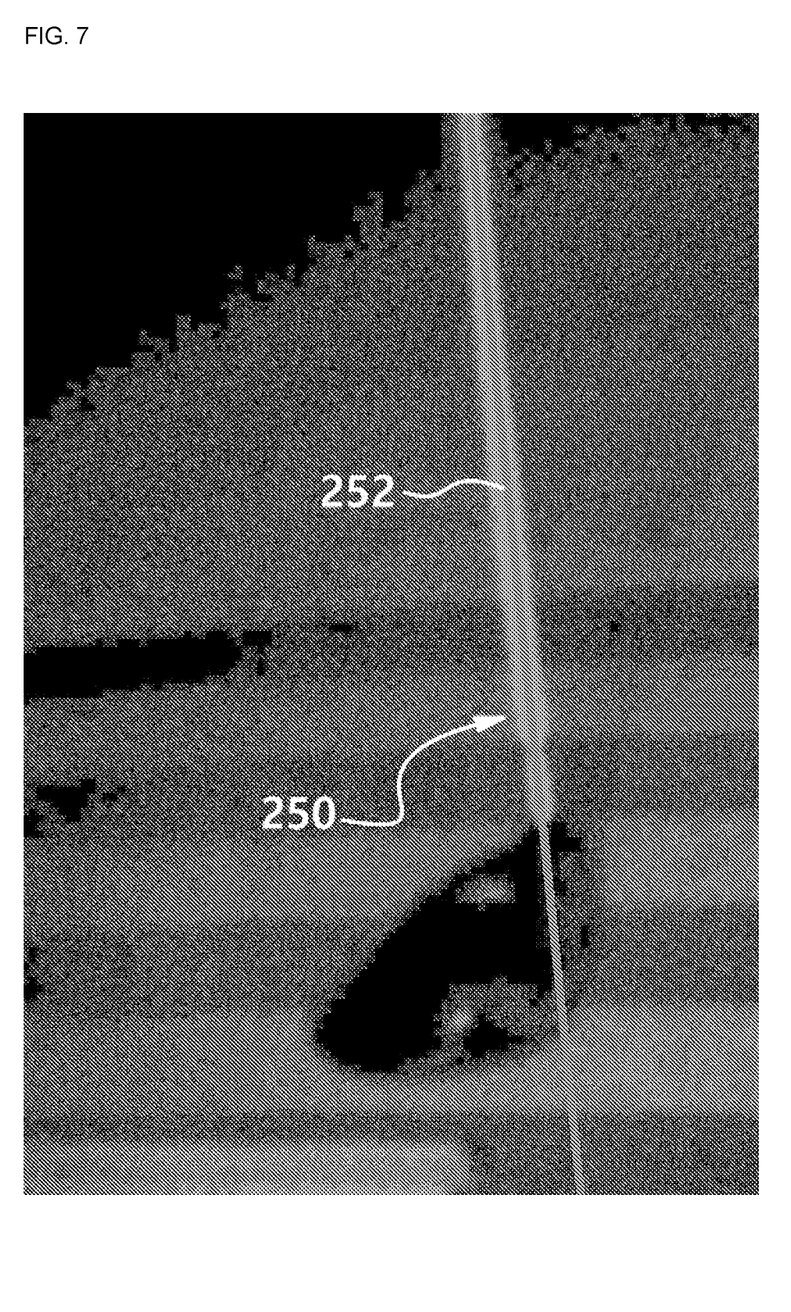
Figure 8:
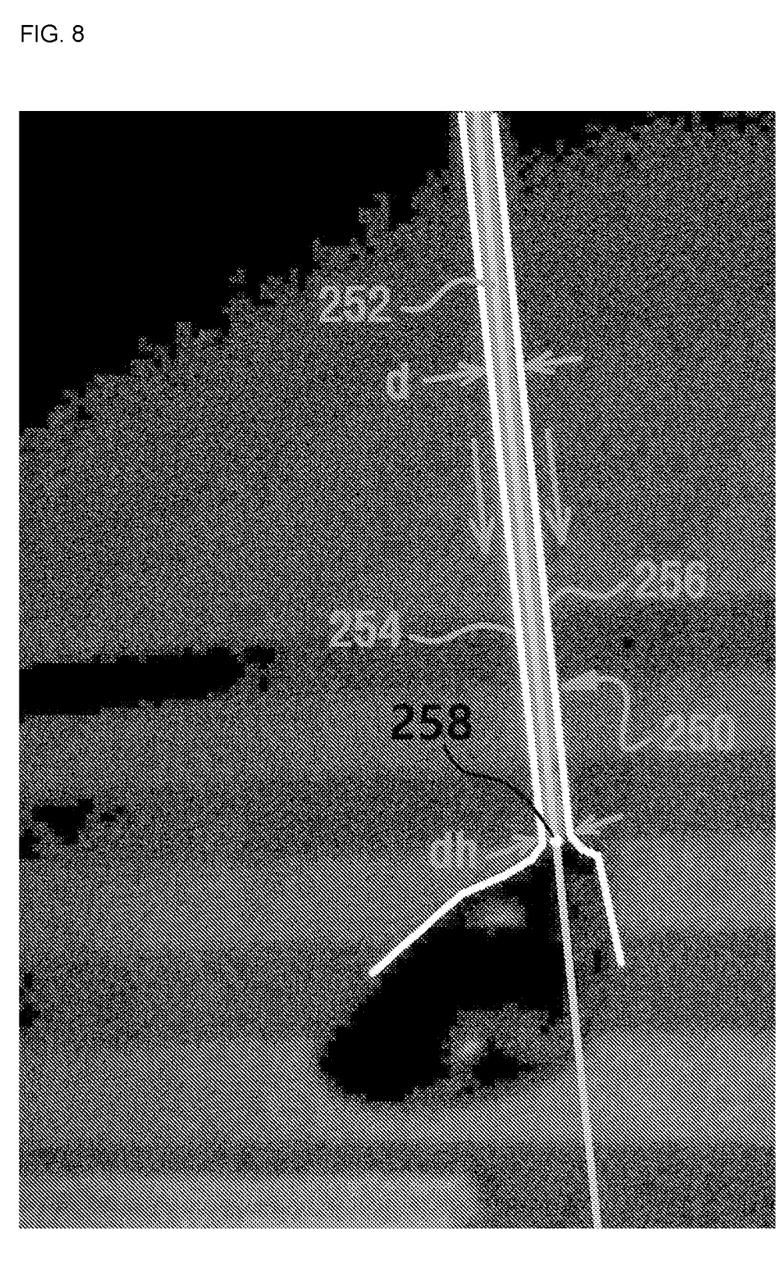

The following description will be given on the assumption that the image shown in FIGS. 6 to 8 is a difference-image-processed image.

A certain object 250 exists in an image IMC obtained through difference image processing. People are capable of easily recognizing the object as a golf club. However, computers must perform predetermined image processing and analysis in order to recognize the object as a golf club.

In the image IMC shown in FIG. 6, the object 250 is a golf club GC, and it is necessary to calculate the position of the portion of the golf club at which a shaft SF and a head HD are connected to each other, i.e. a hosel portion HS of the golf club, as a feature point. In FIG. 6, the shaft SF, the head HD, and the hosel portion HS of the golf club are shown for the convenience of description. In the case in which the sensing processor processes these portions, it is not possible to determine which portion of the golf club is the shaft, the head, or the hosel.

The reason for this is that golf clubs have various shapes, sizes, colors, and materials, as previously described, and therefore it is difficult to find the golf club using a consistent method, such as that used to find a golf ball in the image.

Therefore, the sensing device according to the embodiment of the present invention provides a method of finding the portion of the golf club at which the shaft and the head are connected to each other or the hosel portion of the golf club through image processing, setting the found portion as a feature point, and calculating the feature point as the position of the golf club, rather than a method of perfectly finding the golf club in the image.

FIG. 7 shows that a straight line 252 is detected in the image shown in FIG. 6 through a Hough transform. That is, it is possible to obtain the equation of a straight line for the object 250 in the image through a Hough transform (Hereinafter, referred to as "line detection").

The method of obtaining the equation of a straight line using a Hough transform is already well-known, and therefore a detailed description thereof will be omitted.

Meanwhile, as shown in FIG. 8, the sensing processor extracts left and right contours 254 and 256 of the object 250 based on the straight line 252 detected through line detection.

That is, the edge intensity of each of the pixels in the image may be investigated, and the portions for which the edge intensity value exceeds a predetermined level and is changed abruptly may be extracted as the contours 254 and 256.

The sensing processor extracts the contours 254 and 256 of the object 250, as described above, and analyzes the distance d between the left and right contours. That is, a function (a linear function) for the distance d between the left and right contours is calculated in the downward direction at every position and is differentiated in order to calculate variation in the distance between the left and right contours.

In the case in which the variation in the distance between the left and right contours is analyzed, as described above, the portion of the golf club at which the variation in the distance exceeds a predetermined level and is abruptly increased appears. The portion corresponds to the portion of the golf club at which the shaft and the head are connected to each other, i.e. the hosel portion of the golf club.

In FIG. 8, the portion of the golf club at which the distance between the left and right contours is dh is the portion of the golf club at which the variation in the distance starts to abruptly increase, and the portion becomes the position of the feature point 258.

The sensing processor finds and specifies the position of the feature point 258 in each frame image using the above method, calculates the position of the feature point as the position information of the golf club, and transmits the same to the analysis device.

Figure 9:
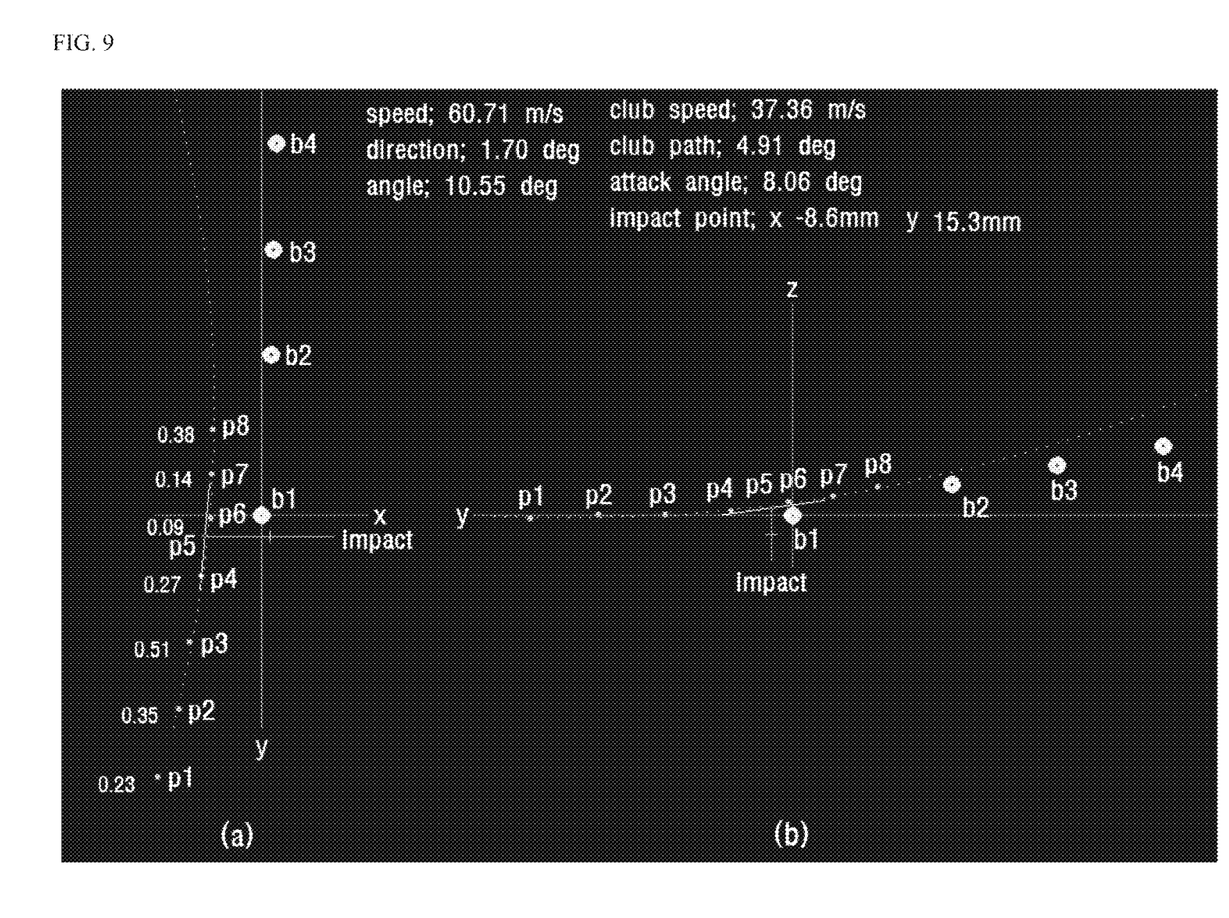
FIG. 9 is a view showing information about a change in the position of the feature point specified using the method described with reference to FIGS. 7 and 8.

FIG. 9 is a graph showing a change in the position of the feature point extracted for each frame using the method shown in FIGS. 7 and 8.

FIG. 9(a) shows a change in the positions p1 to p8 of the feature point and a change in the positions b1 to b4 of the ball in the x-y plane, and FIG. 9(b) shows a change in the positions p1 to p8 of the feature point and a change in the positions b1 to b4 of the ball in the y-z plane.

In FIGS. 9(a) and 9(b), the position p5 corresponds to the position of the feature point of the golf club when an impact occurs.

As described, the position of the portion of the golf club at which the shaft and the head are connected to each other or the hosel portion of the golf club is detected as the position of the golf club in the image, and information about various physical characteristics of the golf club, which is moving, may be easily calculated using the position information of the feature point. Calculation of information about various physical characteristics of the golf club using the position information may be performed by the analysis device.

Industrial Applicability

A sensing device for calculating information about a golf shot taken by a user according to the present invention and a sensing method using the same are applicable to industries related to golf practice, in which the analysis of a ball hit according to a golf swing is performed, and to so-called screen golf, in which a user may enjoy a round of virtual golf through golf simulation based on virtual reality.

The invention claimed is:

1. A sensing method of a sensing device for calculating information about a golf shot taken by a user, the sensing method comprising:
acquiring an image of the user hitting a ball using a golf club;
detecting a portion corresponding to a straight line through predetermined image processing of the acquired image (a line detection step); and
analyzing a change in a shape of the straight portion detected at the line detection step in order to detect a predetermined feature point and calculating a position of the detected feature point as a position of the golf club, wherein the step of calculating the position of the detected feature point as the position of the golf club comprises:
extracting left and right contours based on the straight line detected at the line detection step;
analyzing a change in a distance between the extracted left and right contours; and
detecting a position at which the change in the distance between the left and right contours reaches a predetermined level or higher as the feature point.

2. The sensing method according to claim 1, further comprising:
analyzing a plurality of frame images continuously acquired at the step of acquiring the image in order to specify an impact time at which the golf club hits the ball, wherein
images are extracted during a predetermined period based on the specified impact time, and the line detection step is performed for each of the extracted images.

3. A sensing method of a sensing device for calculating information about a golf shot taken by a user, the sensing method comprising:
acquiring an image of the user hitting a ball using a golf club;
detecting a portion corresponding to a straight line through predetermined image processing of the acquired image (a line detection step); and
analyzing a change in a shape of the straight portion detected at the line detection step in order to detect a predetermined feature point and calculating a position of the detected feature point as a position of the golf club, wherein the step of calculating the position of the detected feature point as the position of the golf club comprises:
specifying contours of a portion of the golf club extending from a shaft to a head through predetermined image processing of the acquired image; and
investigating the contours specified at the step of specifying the contours in order to detect a portion of the golf club at which the head begins from the shaft as a feature point and calculating a position of the detected feature point as a position of the golf club.

4. The sensing method according to claim 3, wherein the step of specifying the contours comprises:
detecting edge intensities of pixels of the portion of the golf club extending from the shaft to the head in the image through the image processing; and
specifying a portion of the golf club at which detected values of the edge intensities are changed to a predetermined level or higher as contours of the portion of the golf club extending from the shaft to the head.

5. The sensing method according to claim 4, wherein the step of calculating the position of the detected feature point as the position of the golf club comprises:
analyzing a change in a distance between the contours of the portion of the golf club extending from the shaft to the head; and
specifying a position of the golf club at which the change in the distance between the contours reaches a predetermined level or higher as the feature point.

6. A sensing device for calculating information about a golf shot taken by a user, the sensing device comprising:
- a camera device for acquiring an image of the user hitting a ball using a golf club; and
- a sensing processor for detecting a portion corresponding to a straight line through predetermined image processing of the acquired image, analyzing a change in a shape of the detected straight portion in order to detect a predetermined feature point, and calculating a position of the detected feature point as a position of the golf club, wherein the sensing processor is configured to extract left and right contours based on the straight line, to analyze a change in a distance between the extracted left and right contours, and to detect a position at which the change in the distance between the left and right contours reaches a predetermined level or higher as the feature point.

7. A sensing device for calculating information about a golf shot taken by a user, the sensing device comprising:
- a camera device for acquiring an image of the user hitting a ball using a golf club; and
- a sensing processor for finding a hosel portion of the golf club at which a shaft and a head are connected to each other through predetermined image processing of the acquired image, setting a position of the found hosel portion as a feature point, and calculating a position of the feature point as a position of the golf club, wherein the sensing processor is configured to process to:
- extracting left and right contours based on the shaft detected by a straight line;
- analyzing a change in a distance between the extracted left and right contours; and
- detecting a position at which the change in the distance between the left and right contours reaches a predetermined level or higher as the feature point.

8. The sensing device according to claim 7, wherein
- the camera device comprises a plurality of cameras for acquiring images of a same object at different viewing angles, the cameras being synchronized with each other in order to constitute a stereo-type camera, and
- the sensing processor is configured to analyze an image acquired by one of the cameras in order to specify an impact time at which the golf club hits the ball, to extract images from the respective cameras during a predetermined period based on the specified impact time when the impact time is specified, and to detect the feature point through the image processing of the extracted images.

* * * * *